G. H. CAVANAGH.
Pile-Cutters.
No. 156,204. Patented Oct. 27, 1874.
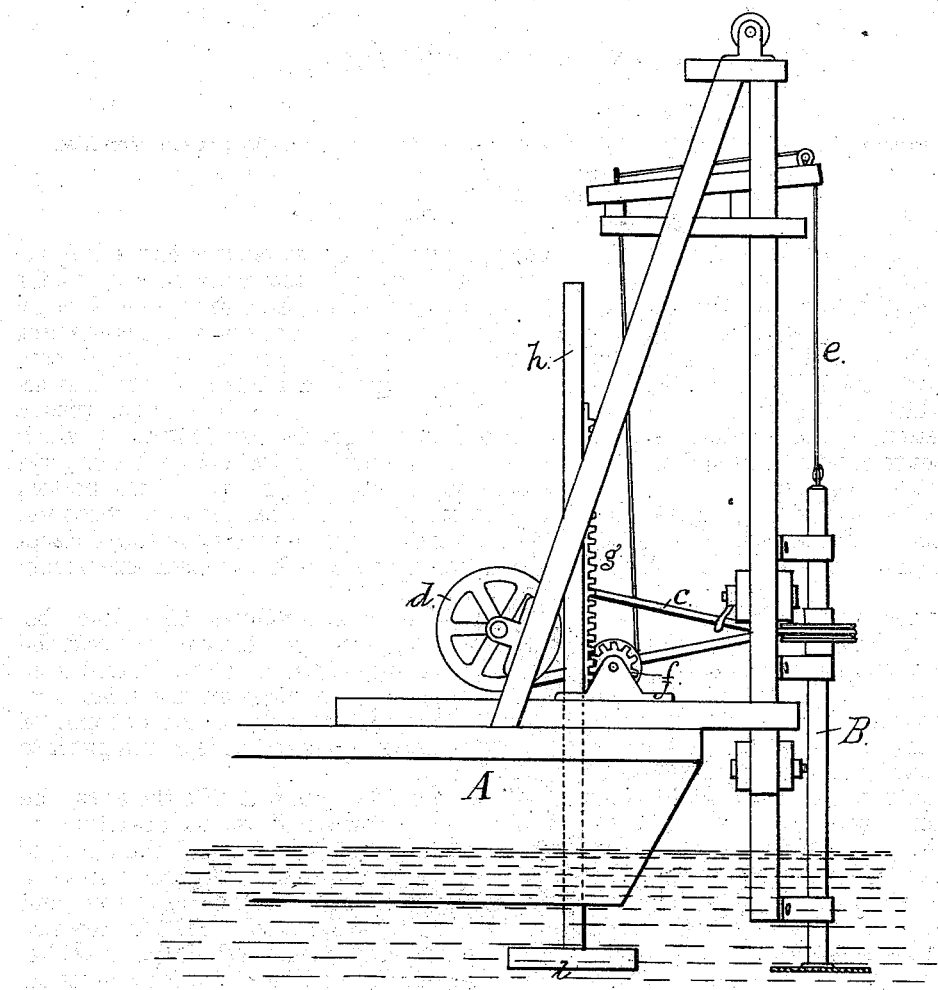
Witnesses.
Pennington Halsted
Chas. C. Earle
Inventor.
George H. Cavanagh.
per John J. Halsted
Att'y.

UNITED STATES PATENT OFFICE.

GEORGE H. CAVANAGH, OF BOSTON, MASSACHUSETTS.

IMPROVEMENT IN PILE-CUTTERS.

Specification forming part of Letters Patent No. 156,204, dated October 27, 1874; application filed September 17, 1874.

*To all whom it may concern:*

Be it known that I, GEORGE H. CAVANAGH, of Boston, in the county of Suffolk and State Massachusetts, have invented an Improvement in Pile-Cutters; and I do hereby declare that the following, taken in connection with the drawings which accompany and form part of this specification, is a description of my invention sufficient to enable those skilled in the art to practice it.

The object of this invention is a great economy in labor and attendance in the working of the saw, incident to the rising and falling of the tide.

When pile-cutters are erected upon floating scows, the rise and fall of the tide raises or lowers the scow, and shifts accordingly the position of the saw with reference to the pile to be cut, thus requiring frequent and accurate adjustments to enable the saw to preserve its proper position, and usually the labor and expense of two men whose services might otherwise be dispensed with.

By my present construction I avail myself of the variations in the tides, as the means for adjusting the position of the saw, to insure that it shall be sure to cut a pile at the desired place, so that any number of piles may all be cut off at an uniform height, and this automatically. To this end my invention consists in combining with a gear-wheel on the drum-shaft from which the saw-shaft is raised or lowered a vertically-sliding rack, the lower end of which resting on the top of a pile already sawed causes the saw-shaft, through the agency of the rack, gear, drum, and cord or chain, to cause the rising and falling of the saw to coincide with the rising and falling of the rack as the scow rises or falls with the tide.

In the drawings, $a$ represents a portion of a scow, to which the apparatus is secured; $b$, the saw-shaft, driven in any usual manner, as, for instance, by a belt, $c$, from the pulley $d$, or by a crank-shaft. The cord $e$ from the saw-shaft, passing over proper guides or pulleys, connects with a drum on a shaft, to which is secured a gear-wheel, $f$, which engages with a vertical rack, $g$, on the bar or beam $h$, which is free to rise or fall in vertical guides or ways extending through the scow. At the bottom of this rack-beam is a flat plate, $i$, whose under side is designed to rest upon the horizontal top of a pile which has been previously cut.

The operation is as follows: The plate $i$ being lowered to rest upon the cut pile, and the saw-shaft being adjusted to the desired position, (which may be either in the same horizontal plane with the top of the cut pile, or higher or lower, if desired,) the saw is put into action.

When the tide rises and lifts the scow, the rack-beam, by reason of its own gravity, continues to rest upon the pile, and the rising of the scow turns the gear on the rack so as to unwind the rope or chain from the drum, and so to lower the saw precisely to the degree that the tide may have risen. When the tide falls, the corresponding falling of the scow forces up the rack-beam and winds up the rope, and elevates the saw accordingly.

I claim—

In combination, with the gear $f$ on the drum-shaft, the upright rack provided with a plate, $i$, and arranged to slide vertically through the scow or vessel, substantially as and for the purpose set forth.

GEO. H. CAVANAGH.

Witnesses:
M. W. FROTHINGHAM,
S. B. KIDDER.